(12) United States Patent
Zhao et al.

(10) Patent No.: US 7,599,687 B2
(45) Date of Patent: *Oct. 6, 2009

(54) APPARATUS FOR CONDUCTING RADIATED PERFORMANCE TESTS OF A WIRELESS DEVICE

(75) Inventors: Wen Zhao, Kanata (CA); Xin Jin, Nepean (CA); C. Nicolas Bugnariu, Ottawa (CA); Muhammad Khaledul Islam, Kanata (CA); Fangyi Luo, Ottawa (CA); Jiansheng Chen, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,501

(22) Filed: Mar. 7, 2008

(65) Prior Publication Data

US 2008/0214117 A1    Sep. 4, 2008

Related U.S. Application Data

(63) Continuation of application No. 10/663,591, filed on Sep. 16, 2003, now Pat. No. 7,359,701.

(51) Int. Cl.
*H04Q 7/20* (2006.01)
(52) U.S. Cl. .............. 455/423; 455/424; 455/425; 455/67.11; 455/67.12; 455/67.14
(58) Field of Classification Search .......... 455/418–420, 455/423–425, 67.11–67.15
See application file for complete search history.

(56) References Cited

U.S. PATENT DOCUMENTS 5,125,021 A    6/1992    Lebowitz 5,764,726 A    6/1998    Selig et al.
5,805,667 A *  9/1998    Alvarez et al. ............. 379/1.01
6,223,033 B1 * 4/2001    Lusterman ................. 455/425

(Continued)

FOREIGN PATENT DOCUMENTS

EP    1309214    5/2003

OTHER PUBLICATIONS

Bergmann et al. "Protocol Conformance Testing of a GSM Mobile Station", MRC Mobile Radio Conference, XX,XX, Nov. 1991, pp. 17-24, XP000444227.

*Primary Examiner*—Duc Nguyen
*Assistant Examiner*—Dominic E Rego
(74) *Attorney, Agent, or Firm*—Moffat & Co.

(57) ABSTRACT

A test apparatus for conducting a radiated performance test on a wireless device under controlled test conditions, the test apparatus having an anechoic chamber; a test computer; and an interface, the interface adapted to connect the test computer to the wireless device, the test apparatus being adapted to: establish a data connection on the interface between the test computer and the wireless device; initialize and start a timer for a predetermined interval on the wireless device; subject the wireless device to the radiated performance test in the anechoic chamber after the predetermined interval; and analyze test results on the test computer from a test log stored on the wireless device during the radiated performance test, wherein the interface between the test computer and the wireless device is adapted to be removed during the predetermined interval; for conducting a radiated performance test on a wireless device.

14 Claims, 3 Drawing Sheets

U.S. PATENT DOCUMENTS

| | | |
|---|---|---|
| 6,970,702 B1 | 11/2005 | Martin |
| 6,980,611 B1 * | 12/2005 | Marino, Jr. .................. 375/346 |
| 7,016,672 B1 | 3/2006 | Lipsit |
| 7,155,171 B2 | 12/2006 | Ebert et al. |
| 7,200,392 B2 | 4/2007 | Kennedy et al. |
| 7,286,961 B2 * | 10/2007 | Kildal ........................ 702/182 |
| 2003/0003883 A1 | 1/2003 | Wallace et al. |
| 2003/0006936 A1 * | 1/2003 | Aoyama et al. ....... 343/700 MS |
| 2003/0008620 A1 * | 1/2003 | Rowell et al. .............. 455/67.1 |
| 2003/0069010 A1 | 4/2003 | Eravelli |
| 2003/0100299 A1 | 5/2003 | Ko et al. |
| 2004/0102187 A1 | 5/2004 | Moller et al. |
| 2004/0203726 A1 | 10/2004 | Wei |
| 2005/0032494 A1 | 2/2005 | Swant |
| 2006/0079222 A1 | 4/2006 | Martin |
| 2007/0254644 A1 | 11/2007 | Dobson et al. |

\* cited by examiner

APPARATUS FOR CONDUCTING RADIATED PERFORMANCE TESTS OF A WIRELESS DEVICE

RELATED APPLICATIONS

The present application is a continuation of U.S. patent application Ser. No. 10/663,591, entitled "Method For Conducting Radiated Performance Tests Of A Wireless Device" filed Sep. 16, 2003. The full disclosure, including the drawings of U.S. patent application Ser. No. 10/663,591 are incorporated herein by reference.

FIELD OF THE INVENTION

The present invention relates to a method for conducting radiated performance tests, and in particular to a method for conducting radiated performance tests without disrupting the antenna pattern of a wireless device.

BACKGROUND TO THE INVENTION

The results of radiated performance tests, including sensitivity tests, of a wireless receiver in an anechoic chamber are strongly dependent on the antenna pattern. The antenna pattern can be altered if additional wires or cables are attached for test purposes but which do not exist under the normal operating conditions for the device. By attaching wires or cables for test purposes, the accuracy of the test results are affected.

Inaccuracies are also further caused by signals travelling along the wires or cables attached for test purposes. These signals generate interference that is radiated into the space around the receiver or are coupled through surrounding circuitry, and this interference or coupling may also affect the test accuracy.

If wireless means such as Bluetooth or IrDa are used instead of cable, the spurious emissions from a Bluetooth or IrDa transceiver may also cause interference that is radiated into the space around the receiver, affecting test accuracy. It is therefore desirable not to use wireless communications other than the test signal during testing.

In wireless devices that normally operate in two directions simultaneously, i.e. transmitting while receiving (either simultaneously in time or being time multiplexed), the transmitting channel can be used as a means to report the receiving performance values. These receiving performance values include bit error rate, frame error rate, block error rate, detection rate, or misdetection rate, false alarm rate, etc. In a device which operates in two directions, no attached wire or cable is necessary. Instead, such devices loop back data that is received or send messages in the transmit direction that report performance values.

For wireless devices that only operate in one direction at a time, or for testing operating modes that only use one direction, or for the type of test equipment that does not have the capability to obtain reported test messages over the air, or for prototypes that have limited test support functionality, other means of retrieving performance data from within the device are needed.

A current method of testing devices includes attaching a cable between the device under test and a computer through a serial interface. Test scripts, which are prepared in advance of the tests, are initiated from the computer and the contents are sent through the data cable to the device. Software on the device under test has the capability of accepting commands received through the data cable. The software further interprets the commands and acts according to these commands. The results of the actions are logged and these logs are sent back to the computer using the same data cable. These log results are further interpreted to obtain the results of the test. Since the data cable is attached to the device all the time during the test to maintain the communication between the device under test and the computer, the results of the test are tainted by the use of the cable.

SUMMARY OF THE INVENTION

The present invention seeks to overcome the deficiency of the prior art by providing a method and apparatus for performing a test while a cable is not connected during the radiated test. The cable can be connected prior to the test and after the test to upload the test instructions and download the logged data respectively.

In one embodiment of the invention, a test cable is connected to the wireless device being tested. The test scripts are uploaded and pre-stored within the storage of the device. A command is sent by the test computer through the data cable to initiate the test script. This start test command also includes a delay of a predetermined length in which a tester can disconnect the cable, orient the device in its proper orientation, and close the door of the anechoic chamber before the test is allowed to run.

After the test is completed, the tester can reconnect the data cable and download test logs, which were stored on the device during the testing period. These logs can then be analysed to obtain the test results.

The present invention therefore provides a test apparatus for conducting a radiated performance test on a wireless device under controlled test conditions, the test apparatus comprising: an anechoic chamber; a test computer; and an interface, said interface adapted to connect said test computer to the wireless device, said test apparatus being adapted to: establish a data connection on said interface between said test computer and the wireless device; initialize and start a timer for a predetermined interval on the wireless device; subject the wireless device to said radiated performance test in said anechoic chamber after said predetermined interval; and analyze test results on said test computer from a test log stored on the wireless device during said radiated performance test, wherein said interface between the test computer and the wireless device is adapted to be removed during the predetermined interval;

The present invention further provides a test apparatus for conducting a radiated performance test on a wireless device under controlled test conditions, the test apparatus comprising: an anechoic chamber; a test computer; and an interface, the interface being adapted to connect the test computer to the wireless device; the test apparatus being adapted to: initialize and start a timer for a predetermined interval on the wireless device; subject the wireless device to said radiated performance test in said anechoic chamber after said predetermined interval; establish a data connection between the test computer and the wireless device; retrieve a test log created during said radiated performance test and storing radiated performance test results from the wireless device to the test computer; and perform an analysis of said test log at said test computer to provide derived test results, wherein the interface is established between the test computer and the wireless device after the radiated performance test.

DETAILED DESCRIPTION OF THE DRAWINGS

Reference will now be made to the drawings.

Figure 1:
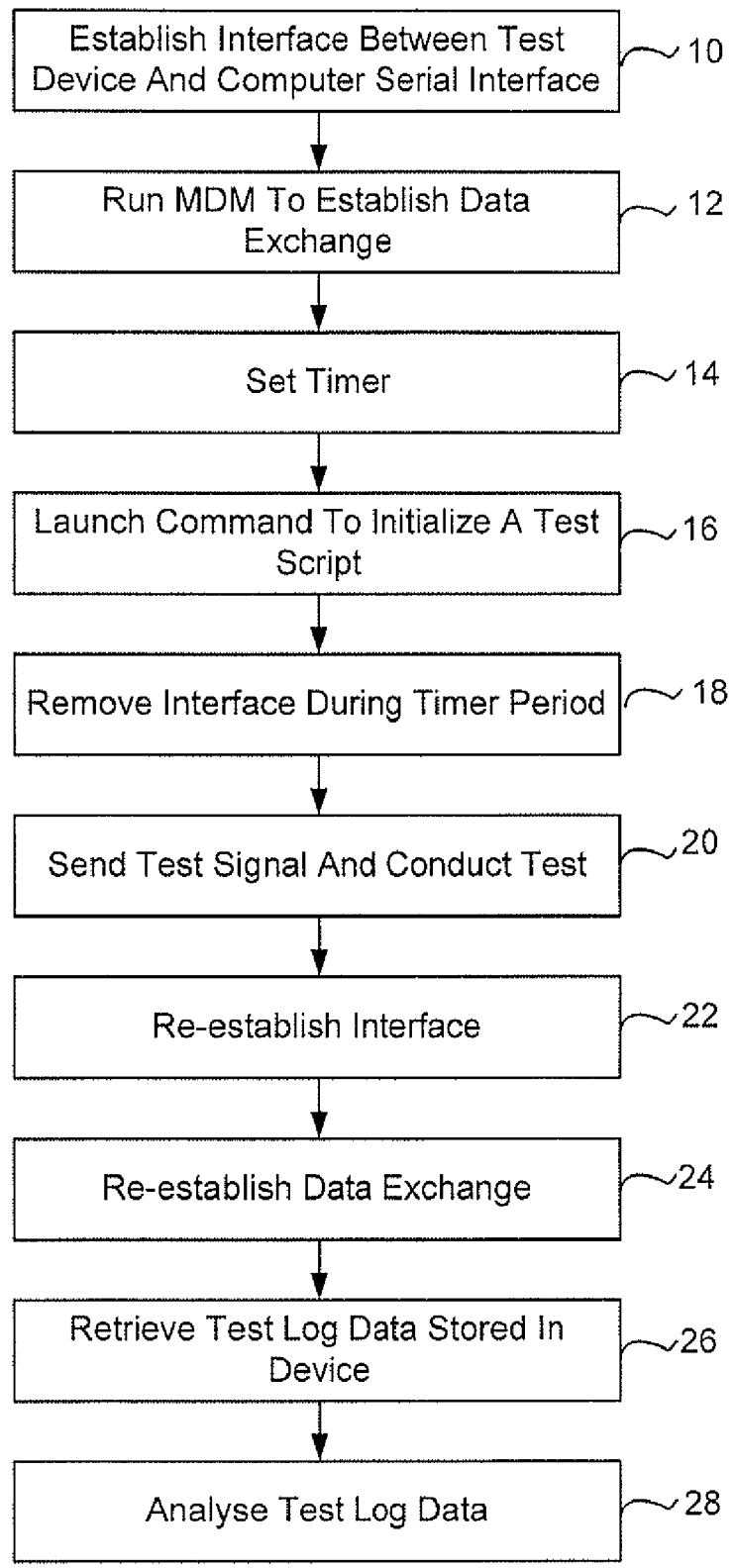
FIG. 1 is a flow chart of the method of the present invention.

FIG. 1 shows a preferred embodiment of the present invention. Commencing with the step identified by reference numeral 10, a data cable is connected between the device that is being tested and the test computer. Preferably, this cable is a serial cable that allows data flow in both directions between the test device and the computer conducting the test. One skilled in the art will however realize that other types of data cable or short range wireless communications means may also be used, and the examples below using a serial cable are not meant to limit the invention. Such wireless communication means may include Bluetooth or IrDA.

The tester next moves to step 12. In step 12, data exchange is established between the test device and the computer. In a preferred embodiment, a software tool such as a mobile diagnostic monitor (MDM) is used. One skilled in the art will realize that other test tools are possible and reference to the use of the MDM is by way of example only. The MDM has the capability of sending commands to establish data exchange with the device through the data interface. It also has the ability to initialize test scripts and timers, to terminate data exchange and to send commands to receive test logs from the device.

Once data exchange has been established, the tester next moves to step 14. In step 14, the MDM is used to set a timer. The timer is set for a predetermined amount of time, for example 30 seconds.

The tester next moves to step 16 in which a command is used to initialize a test script. This test script is generally prepared in advance to program the actions and configurations of a test. Such actions include configuring test log settings, setting up a call, waiting for a settled receiver condition, configuring the receiver settings to the desired test condition, initializing the receiving session, and repeating the operation a predetermined number of times. Other functions of the test script will be known to those skilled in the art.

The next step 18 is performed during the timer period. In this step, data exchange is terminated, and the tester physically disconnects and removes the data cable from the device. If short range wireless communications are being used rather than a cable, the communications are stopped and the transceiver devices used to communicate with the wireless device under test are preferred to be moved out of the anechoic chamber. The device remains in the anechoic chamber in the desired position and orientation for the test and is ready to perform the received test. The door to the anechoic chamber is closed.

Moving to step 20, a test signal is sent and the radiated test is conducted. The test signal can and in many instances should be radiated within the anechoic chamber in the desired configuration before the timer set in step 14 expires, and this signal should continue to radiate at the given configuration until the test finishes.

Continuing in step 20, the device is receiving the test signal. Software on the device begins executing at the end of the timer period, and the device executes the test script. Data that is gathered from the test is stored in a test log within the device's storage.

At the end of the test period, the tester moves to step 22. In step 22, the door of the anechoic chamber is opened and the data cable is reconnected to the device under test. If short range wireless communication means are used, the wireless communication means are initiated rather than a cable being reconnected.

The tester next moves to step 24. In step 24, the MDM is run to re-establish the data exchange between the test device and the computer.

Moving on to step 26, a command is sent from the MDM to the test device to retrieve the test log data that was stored in the device's storage during the test. This data is received at the computer.

In step 28, the test log data is analysed to obtain the test results. The above method overcomes the disadvantages of the prior art by providing for testing without a data cable being attached. This ensures that the data cable does not interfere with the antenna pattern of the device and therefore more accurate radiated test results are obtained.

Figure 2:
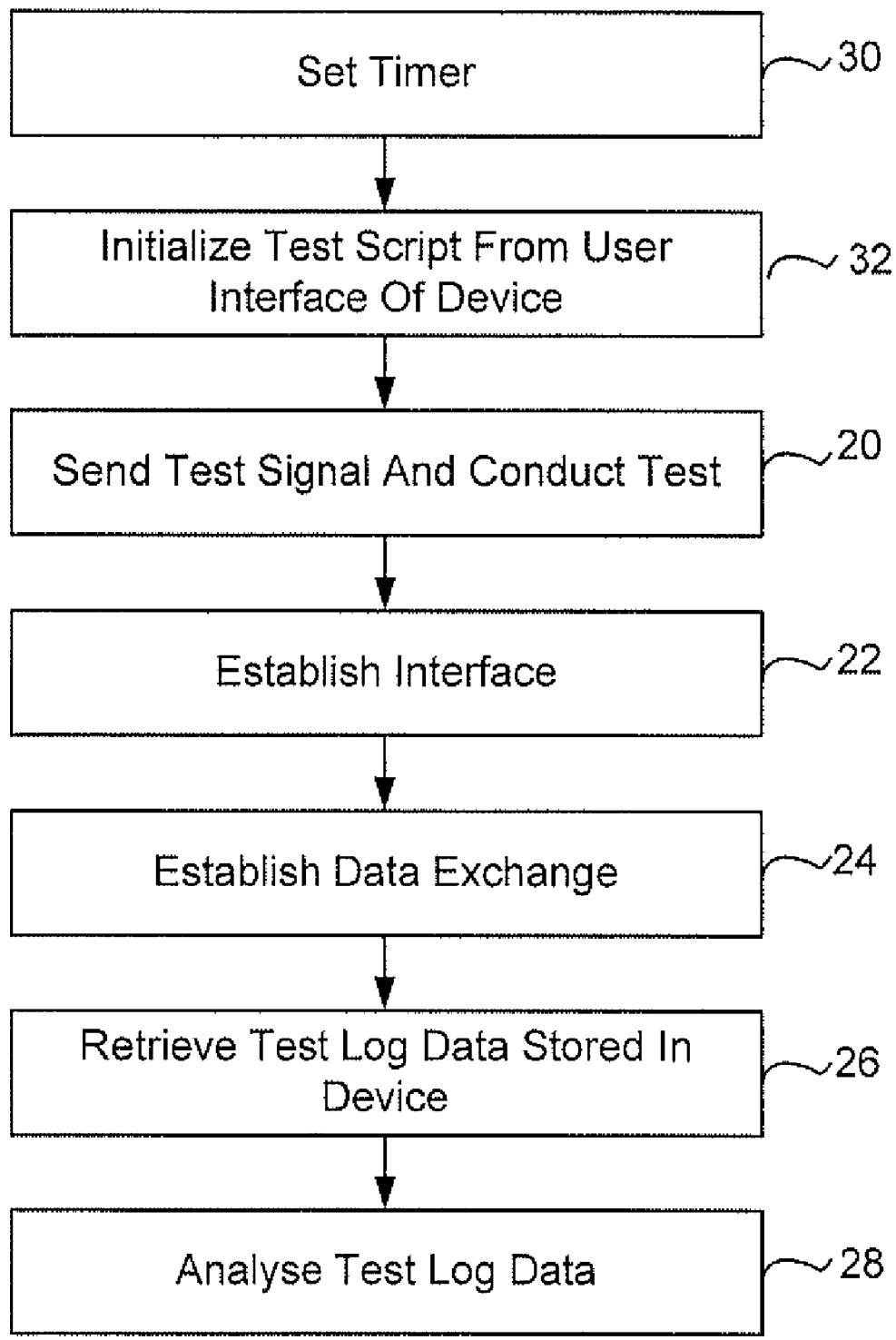
FIG. 2 is a flow chart of an alternative method.

Reference is now made to FIG. 2. In FIG. 2, the method of the test is shown in a flow chart with the steps common between the methods of FIG. 1 and FIG. 2 being identified using the same reference numerals. The principal difference between the methods of FIGS. 1 and 2 is the addition of steps 30 and 32. Rather than setting the timer and launching the command to initialize a test script from the MDM, the method of FIG. 2 contemplates pre-storing a test script, and the timer and test script being initialized from the user interface of the device in steps 30 and 32 respectively. Such initialization could occur from the menu of the engineering section of the device instead of being launched by an MDM command.

The remainder of the steps in the alternative method shown in FIG. 2 are the same as the steps described above with reference to FIG. 1.

Figure 3:
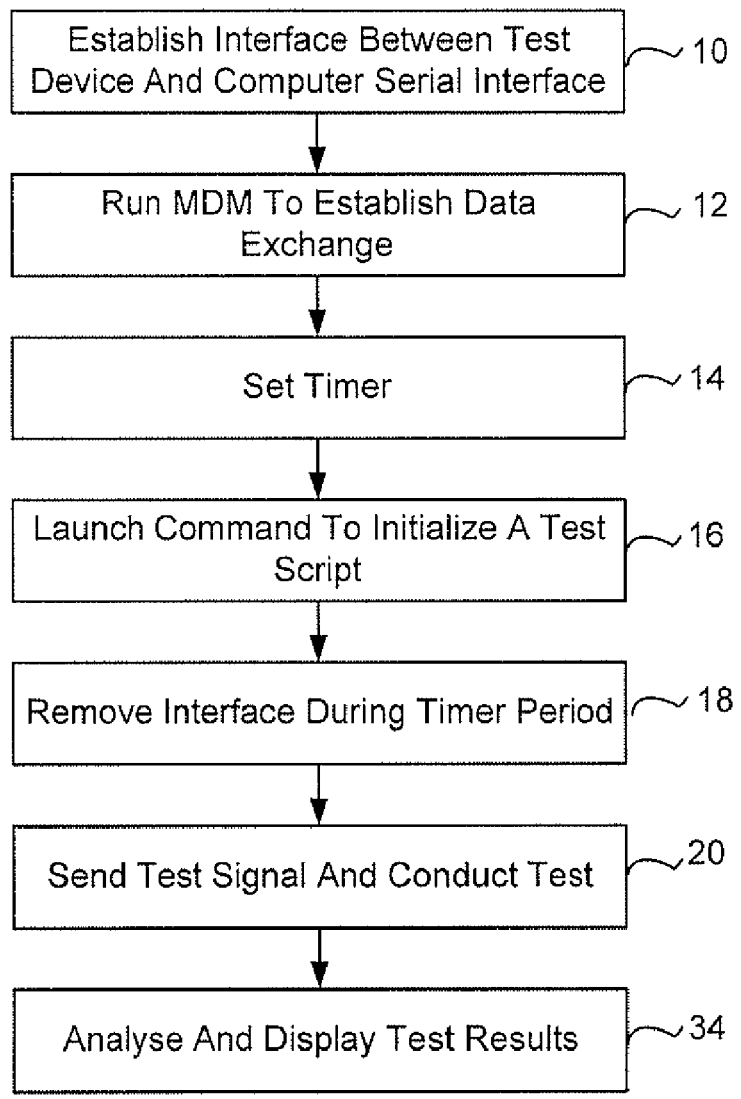
FIG. 3 is a flow chart of a third alternative method.

In a further alternative embodiment, step 28, in which the test log data is analysed by a test computer, is replaced by an analysis of the test results by the test device itself. This alternative can be accomplished using software running on the device that displays the test results on the user interface of the device. For example, a page on the engineering section can show the test results. In this alternative, steps 22 to 28 are replaced with step 34 as illustrated in FIG. 3. One skilled in the art will realize that the alternative method of FIG. 3 can be combined with the method of FIG. 2, thus utilizing steps 30 and 32 rather than steps 10 through 16 in FIG. 3.

In yet another alternative, the MDM and software running in the device allow test scripts to be downloaded or recorded onto the device in step 14. This saves the device's memory when the device is not performing the test, and allows flexibility to alter test scripts. The other parts of the methods of FIGS. 1 and 3 remain the same.

The above described embodiments of the present invention are meant to be illustrative of the preferred embodiments and are not intended to limit the scope of the present invention. Various modifications which would be readily apparent to one skilled in the art are intended to be within the scope of the present invention. The only limitations to the scope of the present invention are set forth in the following claims.

We claim:

1. A test apparatus for conducting a radiated performance test on a wireless device under controlled test conditions, the test apparatus comprising:

an anechoic chamber;

a test computer; and an interface, said interface being configured to connect said test computer to the wireless device, said test apparatus being configured to:

establish a data connection on said interface between said test computer and the wireless device;

initialize and start a timer for a predetermined interval on the wireless device;

subject the wireless device to said radiated performance test in said anechoic chamber after said predetermined interval; and analyze test results on said test computer from a test log stored on the wireless device during said radiated performance test, wherein said interface between the test computer and the wireless device is configured to be removed during said radiated performance test.

2. The test apparatus of claim 1, wherein the interface is a data cable.

3. The test apparatus of claim 1, wherein the interface is a wireless communications interface selected from a Bluetooth and an infrared interface.

4. The test apparatus of claim 1 further configured to:

reestablish said data connection between said test computer and the wireless device upon reestablishment of the interface;

retrieve the test log from the wireless device to the test computer; and perform an analysis of said test log to provide derived test results.

5. The test apparatus of claim 1, wherein said test computer includes a software tool for communications between the wireless device and the test computer.

6. The test apparatus of claim 5, wherein said software tool is configured to send a command to the wireless device to establish the data connection.

7. The test apparatus of claim 5, wherein said software tool is configured to send a command to the wireless device to start a test script.

8. The test apparatus of claim 5, wherein the software tool is configured to send a command to the wireless device to initialize the timer.

9. The test apparatus of claim 1, further comprising a software module configured to load a test script from the test computer to the wireless device.

10. A test apparatus for conducting a radiated performance test on a wireless device under controlled test conditions, the test apparatus comprising:

an anechoic chamber;

a test computer; and an interface, the interface being configured to connect the test computer to the wireless device;

the test apparatus being configured to:

initialize and start a timer for a predetermined interval on the wireless device;

subject the wireless device to said radiated performance test in said anechoic chamber after said predetermined interval;

establish a data connection between the test computer and the wireless device:

retrieve a test log created during said radiated performance test and storing radiated performance test results from the wireless device to the test computer; and perform an analysis of said test log at said test computer to provide derived test results, wherein the interface is established between the test computer and the wireless device after the radiated performance test.

11. The test apparatus of claim 10, wherein the interface is a data cable.

12. The test apparatus of claim 10, wherein the interface is a wireless communications interface selected from a Bluetooth and an infrared interface.

13. The test apparatus of claim 10, wherein said test computer includes a software tool for communications between the wireless device and the test computer.

14. The test apparatus of claim 13, wherein said software tool is configured to send a command to the wireless device to establish the data connection.

* * * * *